Oct. 23, 1962

H. M. HARRISON 3,060,279

MAGNETIC TRANSDUCING HEADS

Filed Oct. 27, 1958

Inventor
H. M. Harrison
By Glascock Downing & Seebold
Attys.

United States Patent Office 3,060,279
Patented Oct. 23, 1962

3,060,279

MAGNETIC TRANSDUCING HEADS

Henry Milburn Harrison, Wells, England, assignor to Electric & Musical Industries Limited, Hayes, England, a company of Great Britain Filed Oct. 27, 1958, Ser. No. 769,720
Claims priority, application Great Britain Nov. 6, 1957
3 Claims. (Cl. 179—100.2)

This invention relates to magnetic transducing heads such as are employed in magnetic transducing apparatus where signals are recorded or reproduced magnetically on or from a magnetisable medium such as a tape or drum.

In magnetic transducing apparatus particularly when employed in computing apparatus for transducing digital information, the information is usually contained in a series of tracks on the magnetisable medium and it is usual to employ for transducing such information a transducing head which functions both to apply information to the medium and also to reproduce information therefrom. The application of the information to the medium is usually termed a "writing operation" and the reproduction of the information therefrom is usually called a "reading operation." When a common transducing head is employed for reading and writing the arrangement may be such that any previously recorded information is erased during the process of writing, but in this case, during the reading operation, it is frequently found that the previously recorded information is not completely erased with the result that during a subsequent reading operation the un-erased previous recording is sometimes read. Similar difficulties may also arise when transducing heads share the same track (as in a circulating register) due to slight misalignment between a writing head and its associated reading head or heads.

The object of the present invention is to provide an improved transducing head with a view to overcoming or reducing this difficulty.

According to the invention there is provided a magnetic transducing head having a pair of pole tips disposed in juxta-position so as to define a non-magnetic gap therebetween wherein one of said pole tips of said pair is wider than the other pole tip of said pair.

When such a head is mounted in transducing apparatus with the wider pole tip as the trailing pole tip the previously recorded signals during a writing operation will be obliterated to a width corresponding to the width of the wider pole tip, but during a reading operaton signals will be read from a width of the transducing medium smaller than the width of the wider pole tip so that there is less possibility of reading signals not completely obliterated by a previous recording.

In order that the said invention may be clearly understood and readily carried into effect, it will now be more fully described with reference to the accompanying drawings in which:

FIGURE 1 illustrates diagrammatically a transducing head in accordance with one embodiment of the invention, FIGURE 1*a* illustrates diagrammatically the embodiment of a head such as shown in FIGURE 1 in magnetic transducing apparatus, FIGURE 2 is an enlarged view of a side elevation of the pole tips of the transducing head shown in FIGURE 1 looking at the right-hand side of the head shown in FIGURE 1, FIGURE 3 is a plan view of the pole tips shown in FIGURE 2, FIGURE 4 is a side elevation of the core of a transducing head according to another embodiment of the invention.

Figure 1:
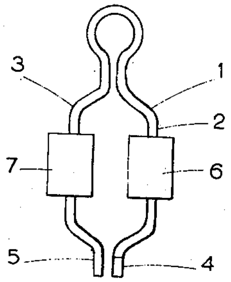
Figure 2:
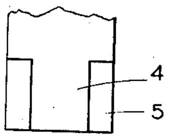
Figure 3:
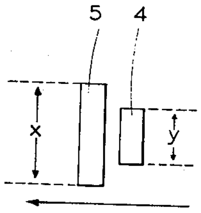
Figure 1A:
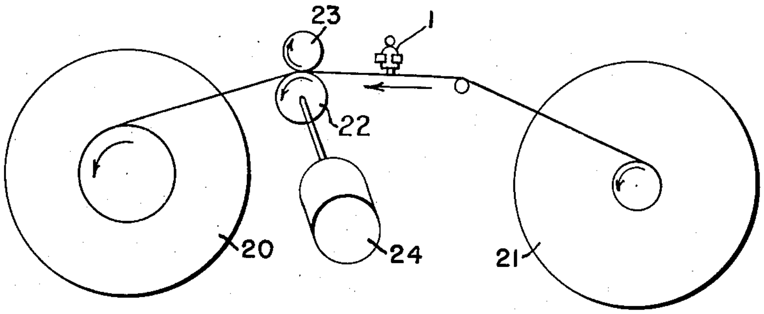

The invention is shown in FIGURES 1, 2 and 3 of the drawings as applied by way of example to a combined reading/writing transducing head of the form described in British patent application Number 17,641/57. As shown in FIGURE 1 the transducing head comprises a magnetic core 1 comprising a strip of magnetic material which is bent to the configuration shown to provide a pair of substantially parallel limbs 2 and 3, the lower ends of said limbs in FIGURE 1 being bent into substantially parallel relationship and disposed in juxtaposition so as to form pole tips 4 and 5. The pole tips 4 and 5 are spaced to provide a non-magnetic gap which may be filled with a suitable spacer of non-magnetic material. The core 1 may be formed from a single strip of magnetic material or may be of a laminated construction. Surrounding each of the limbs 2 and 3 is a coil 6 and 7. When the head shown in FIGURE 1 is employed for writing, signals to be applied to the magnetisable medium which may be a tape having a magnetisable coating or a drum having a magnetisable coating, are fed to the coils 6 and 7 so as to set up a flux across the gap between the pole tips 4 and 5. This is represented in FIGURE 1*a* in the case of magnetic tape transducing apparatus, in which figure two magnetic tape spools are denoted by the references 20 and 21, the tape driving capstan is denoted by the reference 22, the capstan co-operating with a pressure roller 23 and having a drive motor 24 which drives the capstan in the sense required for a tape movement in the direction of the arrow 24 for the operations of reading and writing. When the head is employed for reading, the passage of a magnetised tape or drum past the tips 4 and 5 causes signals to be set up in the coils 6 and 7 in well known manner. During a writing operation the arrangement may be such that matter previously recorded on the magnetisable medium is erased and with known forms of heads it is found that during a reading operation the head tends to pick up signals from the fringes of the track not completely erased during the writing operation. In order to overcome or reduce this difficulty the width i.e. the dimension "$x$" shown in FIGURE 3 of one of the pole tips is larger than the width i.e. the dimension "$y$" of the other pole tip. As shown in FIGURE 2 the pole tip 5 is wider than the pole tip 4. Where the core of the head is formed of strip material as described above the narrower pole tip 4 may be formed by machining away the opposite edges of the pole tip as shown in FIGURE 2, the machining being effected so that the centre line of the pole tip 4 coincides with the centre line of the pole tip 5. FIGURE 3 shows a plan view of the pole tips shown in FIGURE 2, the arrow in the figure indicating the direction of movement of the magnetisable medium. In use therefore of the head shown in FIGURE 1 the wider pole tip 5 is the trailing pole tip and when writing, the effective width of the recorded track will be $x$ which is the width of the pole tip 5, but the effective width of the track when reading will be smaller and in theory will be $$y+\frac{x-y}{2}$$

where $y$ is the width of the pole tip 4. Thus the width of the track when reading is less than the width of the track when writing so that there is less danger during reading of the head picking up unobliterated previously recorded signals. The width of the gap may be 1 or 2 mils whilst the wider pole tip may be 30 mils and the narrower tip may be 20 mils, i.e. the ratio of the wider to narrower tips may be 3:2. If desired the recesses formed as a result of narrowing the pole tip 4 may be filled with non-magnetic material such as bass inserts.

Figure 5:
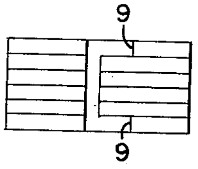
FIGURE 5 is a plan view of FIGURE 4.
Figure 4:
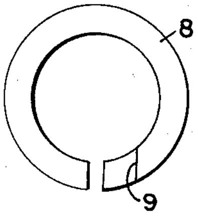

Although the invention has been described above as applied to one particular type of core for the transducing head it will be understood that the invention is equally applicable to other forms of core. One alternative form of core is shown in FIGURES 4 and 5, the core being composed of a plurality of laminations 8 of substantially circular form as shown, each lamination being provided with a radial slot which forms the non-magnetic gap when the laminations are assembled face to face as shown in FIGURE 5. In this form of the invention the narrower pole tip may be formed by shortening the outermost laminations as indicated at 9. The shortened laminations may be made coterminous with the other laminations by non-magnetic material.

Figure 6:
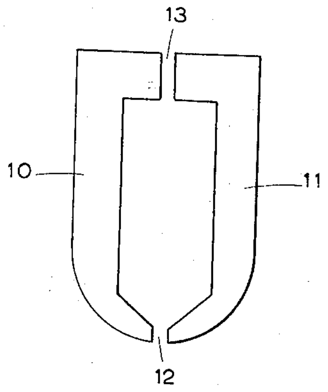
FIGURE 6 is a side elevation of the core of a transducing head according to another embodiment of the invention.
Figure 7:
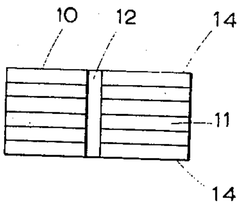
FIGURE 7 is a plan view of FIGURE 6.

FIGURES 6 and 7 illustrate a core according to a further embodiment of the invention. In this embodiment the core is composed of two sets of laminations 10 and 11 of magnetic material of the shape shown which are assembled together to form a substantially closed magnetic path except for the provision of a front non-magnetic gap 12 and a rear magnetic gap 13. In this form of the invention the narrower pole tip may be formed by omitting the outermost laminations of the set 11. Such outermost laminations may be replaced if desired by non-magnetic laminations 14 for example of copper which can function as eddy current screens.

The invention is particularly useful where signals such as digital information are recorded in a plurality of parallel tracks on a magnetisable medium. In such apparatus the plurality of heads employed may all be in accordance with the invention and employed either for writing or reading or both. The invention may of course be applied to multi-track heads. The invention may also be applied to transducing apparatus in which a magnetisable medium is arranged to move in either of two opposite directions and information is recorded or read in either direction of movement. In such an arrangement a pair of heads in accordance with the invention will be employed one for each direction of movement one head being arranged as shown in FIGURE 3 and the other head being arranged with its wider pole tip facing the wider pole tip of the head shown in FIGURE 3 for the opposite direction of movement of the magnetisable medium.

What I claim is:

1. In magnetic transducing apparatus having a magnetic transducing head for both reading and writing and having means for imparting relative movement of predetermined direction between said head and a magnetisable medium for reading and writing operation, the provision in said head of a core made of strip material and with the wide surfaces of said strip material the edges of which are disposed wholly in juxtaposed substantially parallel planes to define an elongated non-magnetic gap, one of said pole tips being wider than the other pole tip and said head being oriented so that said wider pole tip is the trailing pole tip during reading and writing operation whereby the effective width of a track written by said head is wider than the effective width of a track read by said head.

2. In magnetic transducing apparatus according to claim 1 said head having the centre lines of said pair of pole tips substantially in alignment.

3. A magnetic transducing head having a pair of pole tips disposed in juxtaposition and substantially parallel one with the other so as to define a single rectilinear non-magnetic gap therebetween of constant width, one of the pole tips of said pair being wider than the other pole tip of said pair, the pole tips being disposed relatively to one another so that the centre lines thereof are substantially in alignment, whereby the effective width of a track written by said head can be wider than the effective width of a track read by said head, said head having a core made of strip magnetic material with adjacent wide faces thereof disposed in juxtaposed relationship forming said pole tips.

References Cited in the file of this patent

UNITED STATES PATENTS

| | | |
|---|---|---|
| 2,210,770 | Muller-Ernesti | Aug. 6, 1940 |
| 2,615,990 | Blaney et al. | Oct. 28, 1952 |
| 2,689,274 | Saeger | Sept. 14, 1954 |
| 2,736,776 | Camras | Feb. 28, 1956 |
| 2,785,038 | Ferber | Mar. 12, 1957 |
| 2,832,839 | Muffly | Apr. 29, 1958 |
| 2,848,556 | Roys | Aug. 19, 1958 |
| 2,928,079 | McNutt | Mar. 8, 1960 |
| 2,943,384 | Wisner | July 5, 1960 |
| 2,951,912 | Sherman | Sept. 6, 1960 |

FOREIGN PATENTS

| | | |
|---|---|---|
| 504,932 | Great Britain | Apr. 28, 1938 |